United States Patent [19]

Kikuchi et al.

[11] 3,875,521

[45] Apr. 1, 1975

[54] AUTOMATIC GAIN CONTROL CIRCUIT

[75] Inventors: Masafumi Kikuchi; Masashi Takeda, both of Kanagawa, Japan

[73] Assignee: Sony Corporation, Tokyo, Japan

[22] Filed: Sept. 21, 1972

[21] Appl. No.: 291,072

[30] Foreign Application Priority Data

Sept. 23, 1971 Japan .............................. 46-86973

[52] U.S. Cl. ......................... 330/29, 330/24, 330/17

[51] Int. Cl. ............................................... H03f 3/30

[58] Field of Search .................. 330/29, 139, 40, 85

[56] References Cited

UNITED STATES PATENTS

| | | | |
|---|---|---|---|
| 3,065,297 | 11/1962 | Wrathall | 178/70 |
| 3,076,105 | 1/1963 | Robinson et al. | 330/40 X |
| 3,199,041 | 8/1965 | Peretz | 330/40 X |
| 3,268,825 | 8/1966 | Mathes | 330/139 X |
| 3,533,006 | 10/1970 | Kubicz | 330/29 |
| 3,673,498 | 6/1972 | Harford | 330/29 X |

*Primary Examiner*—Nathan Kaufman
*Attorney, Agent, or Firm*—Lewis H. Eslinger; Alvin Sinderbrand

[57] ABSTRACT

A circuit for controlling the gain of an amplifier to prevent signal clipping even if the power supply voltage drops. The AGC amplifier has one input electrode connected to the output of the main amplifying circuit and a second input electrode connected by a non-linear circuit to one terminal of the power supply to vary the bias on this transistor with changes in the power supply voltage so as to stabilize the operation of the transistor in spite of changes in the amplitude of the audio signal due to the changes in the power supply voltage. The transistor furnishes an AGC signal to control a variable impedance across the input of the amplifier to be controlled. The variation in this impedance reduces the gain of the controlled amplifier when amplifying high signal levels.

4 Claims, 1 Drawing Figure

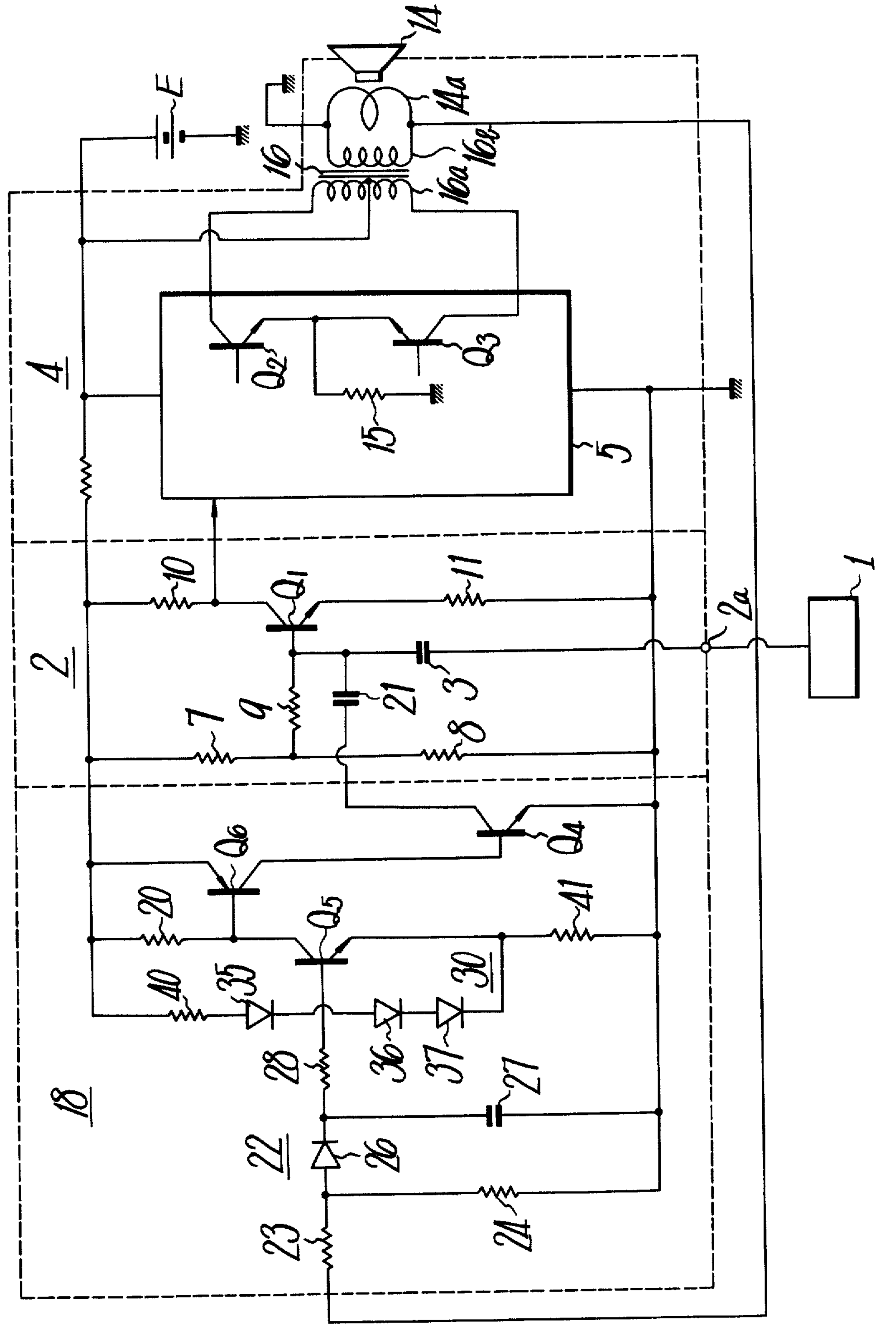

AUTOMATIC GAIN CONTROL CIRCUIT

BACKGROUND OF THE INVENTION

1. Field of the Invention

The present invention relates to an AGC circuit, and more particularly to a novel AGC circuit which makes possible an amplifying circuit that produces an output signal substantially without distortion.

2. Description of the Prior Art

In audio devices, such as magnetic tape recording and reproducing apparatus, phonograph devices, radio receivers and so on, an AGC circuit is provided in order to reproduce, substantially without distortion, input signals having excessively high amplitudes. The AGC circuit usually includes a detector circuit for detecting the level of the output signal that appears at the output terminal of the output amplifier, and a variable impedance element, such as a transistor connected to the input side of the output amplifier and in parallel therewith. The transistor changes its impedance in accordance with the output signal detected by the detector circuit to change the gain of the amplifier automatically. Recently, batteries have been employed more and more frequently as a power source for magnetic recording and reproducing apparatus and radio receivers. Such battery-powered devices have the drawback that when the voltage of the battery drops, the AGC circuit stops its AGC operation, which causes the tone quality of reproduced sounds to deteriorate. This may be caused by the fact that the level of the signal from the output circuit is reduced due to reduction of the voltage of the battery used therein, and, as a result, the level of the rectified output signal is reduced correspondly, which stops the AGC operation. The voice or sound output signal derived from the output circuit is therefore clipped.

In AGC circuits used heretofore, an AGC signal-producing transistor is provided between the detector circuit and the variable impedance element, which, as started, may be a transistor. When the voltage of the power source or the battery is kept at a predetermined value, the transistor that produces the AGC signal is supplied with a predetermined bias to produce an AGC signal by comparison of the bias voltage applied thereto with a voltage based upon the detected signal from the detector circuit. If the battery voltage is reduced, the detected output of the detector circuit does not become large enough to operate the AGC signal-producing transistor, even if a high amplitude signal is applied to the input of the amplifier. As a result, no AGC signal is delivered from the transistor that is supposed to produce the AGC signal. For this reason, the signal applied to the amplifier is clipped, which causes the loudspeaker to produce distorted sound.

It is apparent that the above-mentioned drawback encountered in battery-powered devices also appears in devices that use rectified AC as a power source if the voltage is reduced.

It is an object of the present invention to provide an AGC circuit in which the AGC operation can be positively performed even if the voltage of the power source is reduced.

It is another object of the present invention to provide an AGC circuit in which an amplified output signal, relatively free from distortion, can be derived in spite of a reduction of the voltage of the power source.

It is a further object of the present invention to provide an AGC circuit in which the common electrode of an AGC transistor is supplied with a bias voltage from the power source through a non-linear circuit.

It is a still further object of the present invention to provide an AGC circuit which is adapted to be incorporated in an integrated circuit.

Other objects of the invention will become apparent from the following description taken in conjunction with the accompanying drawing.

SUMMARY OF THE INVENTION

In accordance with the invention, an amplifying circuit supplied with electric power from a power source that may vary in voltage includes means for providing AGC operation. Such means include means for detecting an output signal from the amplifying circuit, means for changing the gain of the circuit in accordance with the amplitude of the output signal, and non-linear circuit means to supply bias voltage from the power source to a transistor that produces an AGC signal that controls the gain of the amplifying circuit.

BRIEF DESCRIPTION OF THE DRAWING

The only FIGURE is a circuit diagram illustrating one embodiment of an AGC circuit according to the present invention.

DETAILED DESCRIPTION OF THE INVENTION

In the example shown in the drawing, a signal source 1, such as the RF, IF, and detector circuits of a radio receiver, is connected to an input terminal 2*a* of a first stage 2 of an audio amplifier. The input stage 2 includes a transistor $Q_1$ connected as a grounded emitter amplifier and having its base connected to the input terminal 2*a* through a capacitor 3 to receive the input signal to be amplified. The collector of the transistor $Q_1$ is connected to an output circut 4 that includes a push-pull amplifier output amplifier 5 comprising two NPN transistors $Q_2$ and $Q_3$ in the embodiment illustrated. The power supply to operate the amplifying circuit is a battery E which is connected to a voltage divider comprising resistors 7 and 8. The intermediate terminal of this voltage divider is connected by way of a resistor 9 to the base of the transistor $Q_1$ to supply bias voltage thereto. The input stage 2 also has a collector load resistor 10 and an emitter bias resistor 11 connected to the transistor $Q_1$.

In addition to the output amplifier 5, the output circuit 4 includes a speaker 14 which has a voice coil 14*a*. The push-pull amplifier 5 includes a common bias resistor 15 for the two emitters of the push-pull transistors $Q_2$ and $Q_3$. An output transformer 16 connects the collectors of the transistors $Q_2$ and $Q_3$ to the voice coil 14*a* of the speaker 14. This transformer has a center-tapped primary winding, the ends of which are connected to the collectors of the transistors $Q_2$ and $Q_3$, and the center tap of which is connected directly to the power supply E. The transformer has a secondary 16*b* connected directly across the voice coil 14*a*. Once side of the voice coil 14*a* is connected to ground.

The circuit also includes a portion 18 that produces an AGC signal to control the gain of the amplifier. The AGC portion of the circuit includes a transistor $Q_4$ that acts as a variable impedance element and is an NPN transistor in the illustrated example. It is connected to the first stage 2 of the amplifier in such a way that the emitter and collector electrodes of the transistor $Q_4$ are connected, effectively, to the base and emitter input electrodes of the transistor $Q_1$ by way of a capacitor 21. The effective impedance of the output circuit of the transistor $Q_4$ between the emitter and collector electrodes is controlled by the difference in voltage between the emitter and base of that transistor, and thus the transistor $Q_4$ forms a variable load across the input of the input stage 2 of the amplifier.

An NPN transistor $Q_5$, which produces an AGC signal, is connected in a grounded emitter circuit and has a collector load resistor 20 connected to the positive of the power source E. The collector of the transistor $Q_5$ is also connected directly to the base electrode of a PNP transistor $Q_6$, the emitter which is connected to the supply source E and the collector of which is connected to the base of the transistor $Q_4$.

The voice coil 14*a* is connected to the input side of a rectifying circuit 22 that detects the magnitude of the voltage across the voice coil. The rectifying circuit includes a voltage divider comprising two resistors 23 and 24, a diode 26, and a filter. The intermediate terminal between these two resistors is connected to the diode 26, and the output of the diode is connected to the filter circuit, which consists of a capacitor 27 and a resistor 28. This resistor is connected directly to the base of the transistor $Q_5$. The AGC circuit section 18 includes another voltage divider 30 which comprises three diodes 35–37 and two resistors 40 and 41. The resistor 41 is also connected between the emitter of the transistor $Q_5$ and ground. The resistor 40 at the other end of the voltage divider 30 is connected to the power supply E. The polarity of the diodes 35–37 is such that they are forward-biased by the voltage of the power supply E.

In the operation of the circuit an audio signal obtained from the source 1 and applied to the input stage 2 of the audio amplifier is amplified by the transistor $Q_1$ and is then applied to the output circuit 4. This signal, which may be further amplified if necessary, is applied in the correct polarity relationship to the push-pull transistors $Q_2$ and $Q_3$ and is coupled by the transformer 16 to the voice coil 14*a* of the speaker 14.

In the AGC circuit portion 18, the emitter of the transistor $Q_5$ is supplied with a bias voltage derived from the voltage of the power supply E. Any change in the magnitude of the power supply voltage is directly coupled to the emitter of the transistor $Q_5$ by the resistor 40 and the non-linear diodes 35–37. Thus, if the voltage of the power supply E decreases, the voltage at the emitter of the transistor $Q_5$ will also decrease, and by a greater amount than if the voltage divider 30 consisted only of linear components such as resistors, instead of including the non-linear diodes 35–37.

The output voltage across the voice coil 14a is applied to the rectifying circuit 22 by way of the voltage divider comprising the resistors 23 and 24. The diode 26 and the filter circuit comprising the capacitor 27 and the resistor 28, derive a relatively smooth voltage, the magnitude of which corresponds to the voltage across the voice coil 14a. This voltage is applied to the base of the transistor $Q_5$.

If the voltage at the base of the transistor $Q_5$ is higher than the voltage at the emitter of that transistor by a predetermined value, the transistor $Q_5$ becomes conductive to control the gain of the audio amplifier. When the voltage of the power supply E is relatively high, the transistor $Q_5$ is not conductive unless both the voltage applied to its emitter electrode and the voltage applied to the base electrode are correspondingly high. On the other hand, when the voltage of the power supply E is relatively low, the current flowing through the diodes 35–37 is reduced substantially and the voltage applied to its emitter electrode of the transistor $Q_5$ is lower than it would be if the power supply voltage were simply divided by linear circuit elements, such as resistors. As a result, even if the rectified output applied to the base of the transistor $Q_5$ is relatively low, the transistor becomes conductive in response to excessively high signal voltage levels, as would be the case if the power supply voltage remained high.

When the amplitude of the signal across the voice coil 14a is higher than a predetermined level, the impedance of the transistor $Q_4$ is reduced by the AGC signal to reduce the amplitude of the input signal applied to the base of the transistor $Q_1$. As a result, the amplitude of the signal through the amplifying circuit is reduced enough so as not to be clipped, irrespective of the magnitude of the voltage of the power supply E. With the AGC circuit described, satisfactory AGC operation is achieved even if the voltage of the power supply E is reduced. Even though the volume of sound from the speaker becomes relatively low, its tone quality is not deteriorated because the output signal is not clipped and is therefore free from distortion that would otherwise be imposed upon it.

In the AGC circuit of the present invention, the voltage at the emitter of the transistor $Q_5$ follows any change in the voltage in the power supply E. The change in the emitter voltage of $Q_5$ is sufficient to correspond to any change in amplification of the audio signal due to a change in the power supply voltage, and thus the effect produced by the transistor $Q_5$ is more nearly independent of the power supply voltage.

The non-linear circuit means comprising the diodes 35–37 and the voltage divider 30 may be replaced by the emitter-collector circuit of another NPN transistor having its emitter connected to the emitter of the transistor $Q_5$ and its collector connected to the positive electrode of the power supply E. Such an additional transistor would have its base connected to the positive electrode of the power supply E by way of a series resistor and diode.

It should be noted that, since the AGC circuit portion 18 has no capacitive elements except the capacitor 27, it may be conveniently formed as an integrated circuit.

What is claimed is:

1. An automatic gain controlled amplifier circuit comprising:

A. a power supply to furnish voltage to operate said circuit;

B. an amplifying circuit connected to said power supply to be energized thereby and comprising input and output circuits;

C. detector means connected to said output circuit of said amplifying circuit to produce a detected signal the amplitude of which corresponds to the magnitude of the amplified signal at said output circuit;

D. variable impedance means connected to said input circuit of said amplifying circuit and operative to vary the gain of said amplifying circuit;

E. a transistor comprising a pair of input electrodes comprising a biasing electrode and the other of said electrodes comprising a signal input electrode connected to said detector means to produce an automatic gain control signal in response to detected signals derived from said detector means and of excessive amplitude relative to a bias voltage between said electrodes;

F. a voltage divider connected across said power supply and comprising non-linear circuit means connecting said biasing electrode of said transistor to one terminal of said power supply and an impedance connecting said biasing electrode to a second terminal of said power supply for varying the magnitude of bias voltage applied to said biasing electrode in accordance with any change in the voltage of said power supply such that, when the voltage of said power supply is reduced, said non-linear circuit means applies a bias voltage to said transistor biasing electrode that is smaller in magnitude than the proportional reduction in the power supply voltage, thereby to stabilize the operation of said transistor with respect to changes in the detected signal applied to said signal input electrode of said transistor; and G. means connecting an output circuit of said transistor to said variable impedance means to control said variable impedance means in response to the m agnitude of the signal at said output circuit to minimize the distortion of said amplifying circuit by reducing the gain of the amplifying circuit for excessive high-amplitude audio signals.

2. The automatic gain controlled amplifier circuit of claim 1 in which said impedance connecting said biasing electrode to said second terminal comprises a resistor connected in series between said biasing electrode and said second terminal of said power supply.

3. The automatic gain controlled amplifier circuit of claim 2 in which said non-linear circuit means comprise diodes.

4. The automatic gain controlled amplifier circuit of claim 2 in which said power supply is a battery.

* * * * *